Dec. 3, 1963 A. HAREL 3,113,206

BINARY ADDER

Filed Oct. 17, 1960

INVENTOR.
ABRAHAM HAREL
BY John V. Regan
ATTORNEY

United States Patent Office

3,113,206
Patented Dec. 3, 1963

3,113,206

BINARY ADDER

Abraham Harel, Framingham, Mass., assignor to Radio Corporation of America, a corporation of Delaware Filed Oct. 17, 1960, Ser. No. 63,148
3 Claims. (Cl. 235—176)

The present invention relates to a new and improved binary adder.

The adder of the invention comprises three identical compound majority-minority gates. Signals indicative of the input addend, augend and carry quantities are applied to a first of the gates to obtain a carry and a carry-not output signal. The carry-not output signal is applied to the second and third of the gates. The addend and augend quantities are applied to the second gate and the input carry quantity is applied to the third gate. The third input to the third gate is the majority output of the second gate. The majority output of the third gate is the sum output.

The invention is described in greater detail below and is illustrated in the following drawing of which:

Figures 1, 2, 3:
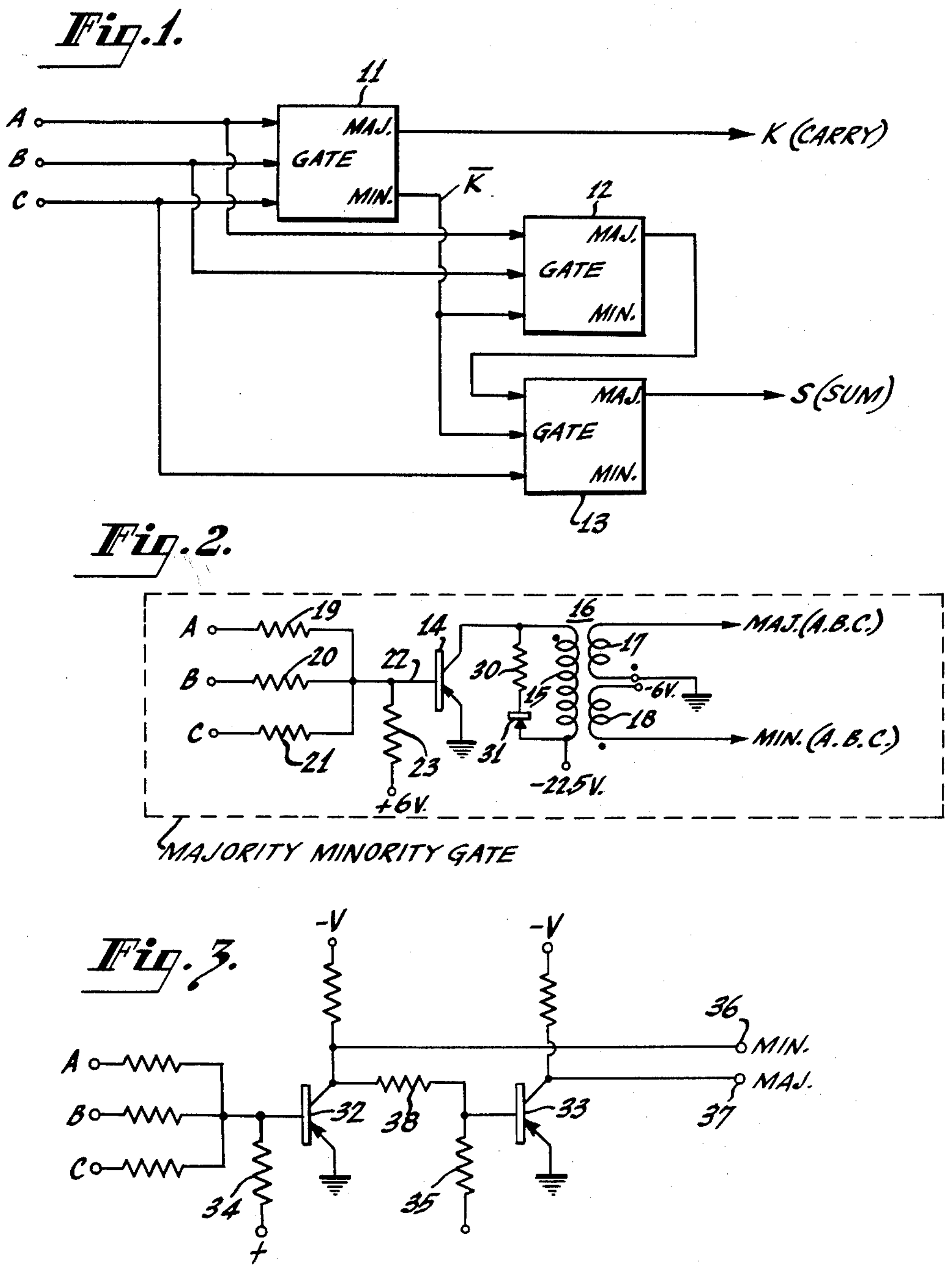
FIG. 1 is a block circuit diagram of an adder according to the invention.
FIG. 2 is a schematic circuit diagram of a majority-minority gate which may be used in the circuit of FIG. 1
FIG. 3 is a schematic circuit diagram of another type of majority-minority gate which may be used in the circuit of FIG. 1.

A minority gate is a device or circuit which has multiple inputs and a single output. The value of the output is the value of the minority of the inputs. A majority gate is a similar device, however, the value of the output is the value of the majority of the inputs. To avoid the indeterminate case, there must be an odd number of inputs to each of the gates.

The circuits of the present invention use a new type of universal computer element known as a compound majority-minority gate. This is a circuit which has an odd number of inputs and a first output having the value of the majority of the inputs and a second output having the value of the minority of the inputs.

The binary adder of FIG. 1 consists of three majority-minority gates. The inputs to the gates are signals indicative of binary digits. A negative voltage of the order of −6 volts or so represents the binary digit "one" and the absence of a negative voltage represents the binary digit "zero." For the sake of the explanation which follows, it is hereafter stated that the binary digit "one" or "zero" rather than a signal or voltage indicative of the binary digit is applied to the gate.

The input addend A, augend B and carry C quantities are applied to the first majority-minority gate 11. The output of this gate includes a carry K quantity and a carry-not $\overline{K}$ quantity. The carry-not quantity is applied as one of the inputs to majority-minority gate 12 and as one of the inputs to majority-minority gate 13. The input quantities A and B are also applied to majority gate 12. The majority output of gate 12 is applied as one of the inputs to gate 13. The third input to gate 13 is the input carry C signal. The majority output of gate 13 is the sum S signal The operation of the full adder of FIG. 1 is described in the truth table below.

| A | B | C | $\overline{K}$ | MAJ (12) | S | K |
|---|---|---|---|---|---|---|
| 0 | 0 | 0 | 1 | 0 | 0 | 0 |
| 0 | 0 | 1 | 1 | 0 | 1 | 0 |
| 0 | 1 | 0 | 1 | 1 | 1 | 0 |
| 0 | 1 | 1 | 0 | 0 | 0 | 1 |
| 1 | 0 | 0 | 1 | 1 | 1 | 0 |
| 1 | 0 | 1 | 0 | 0 | 0 | 1 |
| 1 | 1 | 0 | 0 | 1 | 0 | 1 |
| 1 | 1 | 1 | 0 | 1 | 1 | 1 |

Put into words, the truth table above states that a sum of "one" is produced by the full adder when one or three of the input quantities A, B and C are "one." A carry of "one" is produced when two or three of the input quantities are "one."

The operation of the circuit may perhaps be better understood by one example. Assume that the A input is "zero" and the B and C inputs are "one." In this case, the majority output of gate 11 is $K=1$ and the minority output $\overline{K}=0$. This agrees with the truth table above.

The three inputs to gate 12 are now $\overline{K}=0$, $A=0$ and $B=1$. Accordingly, the majority output of gate 12 is "zero."

The three inputs to gate 13 are: "zero" (the majority output of gate 12), $\overline{K}=0$ and $C=1$. Accordingly, the majority output of gate 13 is $S=0$ which agrees with the truth table above. If the circuit operation is traced for other inputs in a manner similar to that discussed here, the other outputs listed in the truth table are obtained.

A specific majority-minority gate which may be used in the circuit of FIG. 1 is shown in FIG. 2. The circuit includes a PNP transistor 14, the emitter of which is connected to ground. The collector of the transistor is connected to a supply voltage, shown as −22.5 volts, through the primary winding 15 of a transformer 16. Resistor 30 and diode 31 connected across winding 15 serve as a damping network. The transformer has two secondary windings which are oppositely wound, one (17) providing the majority gate output and the other (18) providing the minority output. Secondary winding 17 is grounded at one end and secondary winding 18 is connected to a −6 volt supply at one end.

The inputs to the transistor include three input terminals which are coupled through the resistors 19, 20 and 21 to the base 22. The base is reverse biased by a six volt positive voltage applied through resistor 23. This voltage is of sufficient amplitude to maintain the transistor cut off for "zero" or one binary "one" input to the circuit. Two or three binary "one" inputs to the circuit cause the transistor to conduct.

The circuit of FIG. 2 operates as follows. When the A, B and C inputs are all binary "zero" (zero volts) or when only one of the three inputs is a binary "one" (−6 volts), transistor 14 remains cut off. The current through the transformer 16 does not change (it remains substantially "zero") so that the majority and minority gate outputs remain at their quiescent value. In other words, the majority output is a binary "zero" (zero volts) and the minority output a binary "one" (−6 volts).

When two or more of the inputs are binary "one," the transistor 14 is driven into conduction. A voltage of −6 volts is developed across secondary winding 17 so that the majority output is binary "one." A voltage of +6 volts is developed across secondary winding 16 which subtracts from the −6 volts bias applied to this winding to give a zero volt output from the winding. Accordingly, the minority output is binary "zero."

The circuit of FIG. 2 and the other majority-minority gate described in more detail below are useful not only in the full adder of FIG. 1 but also as universal, flexible logic elements. For example, with a control voltage indicative of the binary digit "zero" applied to one of the inputs to the circuit as, for example, C, the majority output is the logic function "and" (AB) and the minority output is the logic function "nand" ($\overline{AB}$). The truth table is given below.

| A | B | C | MAJ | MIN |
|---|---|---|---|---|
| 0 | 0 | 0 | 0 | 1 |
| 0 | 1 | 0 | 0 | 1 |
| 1 | 0 | 0 | 0 | 1 |
| 1 | 1 | 0 | 1 | 0 |
| Logic Function----- | | | AB(AND) | $\overline{AB}$(NAND) |

If one of the three inputs, for example, C, is always a binary "one," the majority output is the logic function "or" ($A+B$) and the minority output the logic function "nor" ($\overline{A+B}$) as is illustrated in the truth table below.

| A | B | C | MAJ | MIN |
|---|---|---|---|---|
| 0 | 0 | 1 | 0 | 1 |
| 0 | 1 | 1 | 1 | 0 |
| 1 | 0 | 1 | 1 | 0 |
| 1 | 1 | 1 | 1 | 0 |
| Logic Function----- | | | A+B (OR) | $\overline{A+B}$ (NOR) |

If one of the three inputs, for example, C, is always a binary "one" and another of the three inputs, for example, B, is always a binary "zero," the majority output is equal to the same binary digit as the third input and the minority output is equal to the inverted third input as is illustrated in the truth table below.

| A | B | C | MAJ | MIN |
|---|---|---|---|---|
| 0 | 0 | 1 | 0 | 1 |
| 1 | 0 | 1 | 1 | 0 |
| Logic Function----- | | | A | $\overline{A}$ (inversion) |

Here and in the other majority-minority gate described below, the control voltage input to the gate may be an independent variable or, if desired, a dependent variable, that is, an output of another logic element. The $\overline{K}$ output of majority gate 11 illustrates a control voltage which is a dependent variable or, thought of slightly differently, a dynamic control voltage.

The circuit of FIG. 3 is a second type of majority-minority gate which may be used in the circuit of FIG. 1. It includes a first PNP transistor 32 and a second PNP transistor 33. Each transistor-emitter is connected to ground and each transistor-collector is connected through a load resistor to a power supply voltage −V. The base of transistor 32 is connected through a resistor 34 to a source of positive bias voltage. The voltage is of sufficient amplitude to maintain the transistor cut off until two input signals are simultaneously applied to the transistor. The base of transistor 33 is connected through a resistor 35 to a source of negative bias voltage. This voltage is of sufficient amplitude to maintain transistor 33 conducting until it receives an output signal from transistor 32.

The circuit of FIG. 3 operates as follows. When the A, B and C inputs are all binary "zero" or when two of the three inputs are binary "zero," transistor 32 is cut off and binary "one" (−6 volts) appears at minority output terminal 36. Transistor 33 conducts during this interval and binary "zero" (zero volts) appears at majority output terminal 37. When two or more of the inputs are binary "one," transistor 32 is driven into heavy conduction and a binary "zero" (zero volts) appears at output terminal 36. This output signal is applied through coupling resistor 38 to the base of transistor 33 and drives transistor 33 substantially to cut off. This causes the collector voltage to fall to approximately −6 volts and a binary "one" appears at output terminal 37.

While the majority-minority gate of the present invention is shown only in one logic network, namely a full adder, it should be appreciated that uses in many other combinational nets are possible. One advantage of such networks is that all gates are identical thereby simplifying both production and maintenance. Moreover, similar networks may be made to perform many different logic functions merely by appropriate adjustment of control voltages applied to various of the input circuits of the gates.

What is claimed is:

1. A binary adder comprising, in combination, a first majority-minority gate to which addend, augend and carry input signals are applied for producing a carry and a carry-not output signal; a second majority-minority gate to which said addend and augend input signals, and said carry-not output signal are applied; and a third majority-minority gate to which said carry-not output signal, said carry input signal, and the majority output signal of said second gate are applied for producing a sum majority output signal.

2. A binary adder comprising three majority gates; means for applying addend and augend input signals to the first and second of the gates; means for applying a carry input signal to the first and third of the gates; means for inverting the carry output signal of the first gate and applying the inverted signal to the second and third gates; and means for applying the output signal of the second gate to the third gate, whereby said third gate produces a sum output signal.

3. A binary adder as set forth in claim 1 wherein at least some of said majority-minority gates each comprise amplifier means including input terminals for receiving an odd number of input signals indicative of binary digits at least one said signal serving as a control signal for determining the logic function performed by the amplifier means and some signals serving as information signals; a first output circuit of said amplifier means for producing a signal representing the binary digit of the majority of said input signals; and a second output circuit of said amplifier means for producing a signal representing the binary digit of the minority of said input signals.

References Cited in the file of this patent

UNITED STATES PATENTS

| | | |
|---|---|---|
| 2,696,347 | Lo ---------------------- | Dec. 7, 1954 |
| 2,850,647 | Fleisher ---------------- | Sept. 2, 1958 |
| 2,933,252 | Lanning ---------------- | Apr. 19, 1960 |
| 2,971,696 | Henle ------------------ | Feb. 14, 1961 |
| 2,977,486 | Dobbie ----------------- | Mar. 28, 1961 |
| 2,999,637 | Curry ------------------ | Sept. 12, 1961 |

OTHER REFERENCES

Wilkes, M. V., Automatic Digital Computers (John Wiley & Sons, Inc., New York, 1956), pages 234 and 235.